March 4, 1941.　　W. K. CRESON　　2,234,156
CLAMP
Filed March 4, 1940
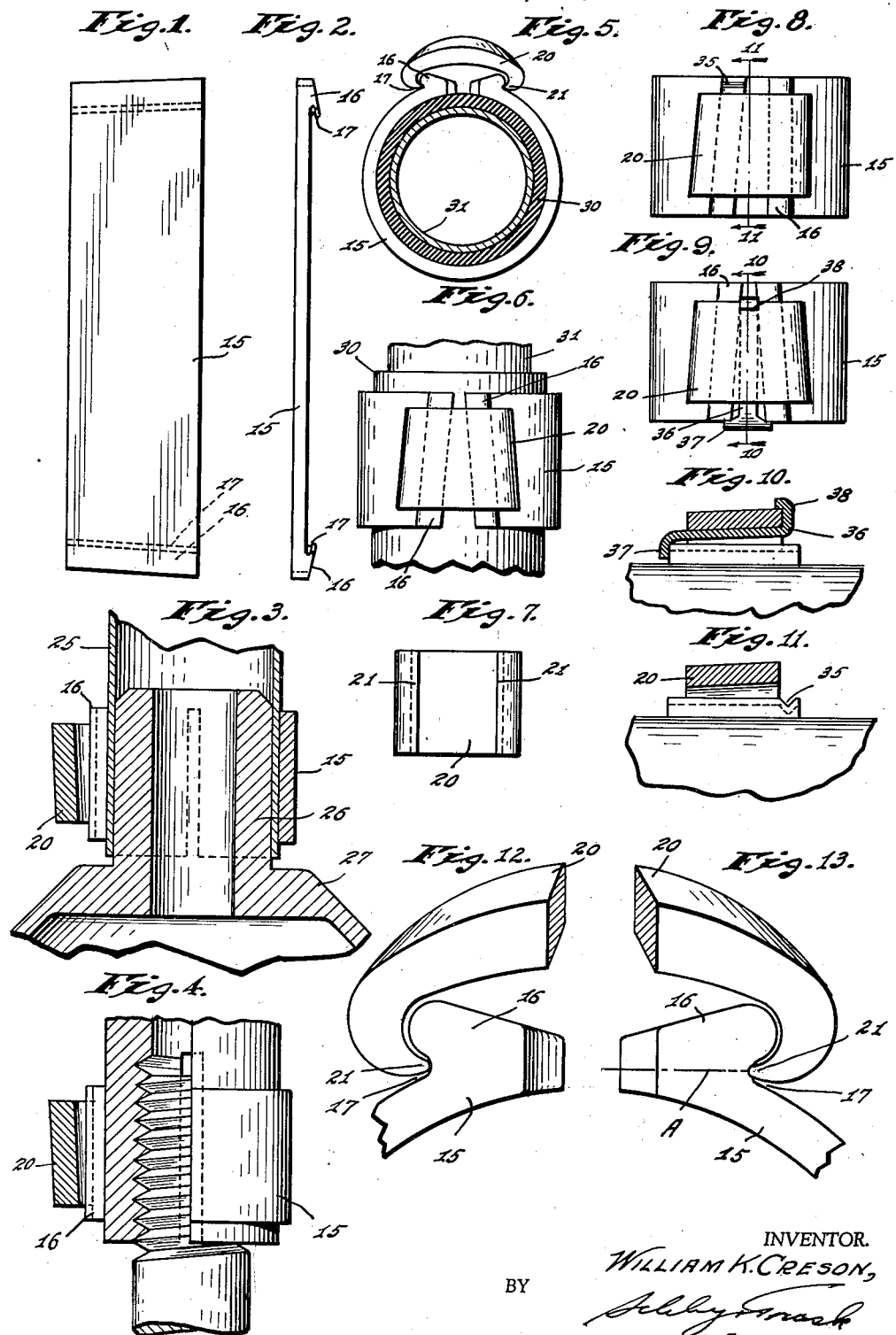
INVENTOR.
WILLIAM K. CRESON,
BY
ATTORNEYS.

Patented Mar. 4, 1941

2,234,156

UNITED STATES PATENT OFFICE 2,234,156

CLAMP

William K. Creson, La Fayette, Ind., assignor to Ross Gear & Tool Company, La Fayette, Ind., a corporation of Indiana Application March 4, 1940, Serial No. 322,255

3 Claims. (Cl. 24—25)

My invention relates to clamp-collars of the type used on cylindrical objects, usually on the outer of two telescoping members for the purpose of contracting the outer member and clamping it to the inner member.

Among the objects of my invention are to simplify the construction and reduce the cost of clamp collars; to produce a clamp collar which will be positive in action and which will be securely locked in clamped condition but which, when necessary, may be released; to produce a clamp collar which may be rapidly applied and tightened; and to produce a clamp collar which will exert throughout its circumference a clamping action which is more nearly uniform than that obtainable with any prior clamp-collars of which I am aware.

In carrying out my invention, I form the clamp collar of two parts—namely, a strap which encircles the member to which the collar is to be applied and a clamping member which acts between the two ends of the strap to draw them toward each other and tighten the clamp. The strap is formed of a strip of metal trapezoidal in shape with its parallel sides extending longitudinally of the strip (i. e. circumferentially of the member to which the strap is to be applied). At its ends, the strap is provided exteriorly with ribs which, when the strap is bent into circular form, are disposed in opposed non-parallel relationship; and in the remote faces of such ribs I form grooves which diverge axially of the collar. The clamping member is of general archshape in cross-section and has its side edges turned inwardly to form lips adapted respectively to engage the bottom of the grooves at the ends of the strap. Axial movement of the clamping member in the direction in which the grooves diverge will draw the two ends of the strap toward each other and tighten the clamp.

The accompanying drawing illustrates my invention: Figs. 1 and 2 are, respectively, a plan view and a side elevation of the strap before being bent into circular form; Fig. 3 is an axial section and Fig. 4 is an elevation in partial section illustrating different applications of the completed clamp; Fig. 5 is a section and Fig. 6 an elevation of another application of the clamp; Fig. 7 is a plan view of the clamping member partially completed; Fig. 8 is an elevation of a modified form of clamp; Fig. 9 is an elevation illustrating one form of means which may be employed to hold the clamping member positively in tightened condition; Fig. 10 is a section on the line 10—10 of Fig. 9; Fig. 11 is a section on the line 11—11 of Fig. 8; Fig. 12 is a fragmental end elevation of the clamp showing the relation of the strap and clamping member before the clamp is tightened; and Fig. 13 is a view similar to Fig. 12 but showing the condition existing after the clamp has been tightened.

In the construction illustrated in the drawing the strap 15 is formed of a strip of metal in the shape of a trapezoid with its parallel sides extending longitudinally. The non-parallel ends of the strap 15 are thickened to form ribs 16 located on the same side of the strap, and the remote faces of the ribs 16 are provided with grooves 17. The ribs 16, with their grooves 17, may be, and preferably are, formed by the cold upsetting of flat strip stock. The strap formed as described is then bent into circular form, as is clear from Figs. 5 and 6, with the strap-ends spaced apart and with the ribs 16 and grooves 17 in non-parallel relationship.

The clamping member 20 is arch-shaped in cross-section, its two longitudinal edges being turned inwardly to form lips 21 adapted to be received respectively in the grooves 17 of the strap. Conveniently, the clamping member is originally formed of uniform cross-section throughout and is then deformed, as by increasing progressively the degree of cross-sectional arching toward one end of the clamping member, to bring the lips 21 into non-parallel relationship complementary to the grooves 17 in the strap.

An important feature of the present invention resides in the cross-sectional shape of the grooves 17 in the strap and the lips 21 on the clamping member. As will be clear from Fig. 12, the thickness of the lips is appreciably less than the width of the grooves 17, so that each lip 21 engages only the bottom of the associated groove 17 and is free from contact with the side walls of the groove. Desirably, the radius of curvature of the extreme end of the lip is less than the radius of curvature of the groove-wall at the point where the lip engages it, so that the lip engages the groove-bottom with substantially line contact.

To tighten a clamp embodying my invention, it is only necessary to slide the wider end of the clamping member 20 over the ribs 16 from that side of the clamp on which the ribs are closest together, with the lips 21 received in the grooves 17, and then to drive or otherwise force the clamping member toward the opposite side of the strap 15. Because the bottoms of the grooves 17 diverge toward that opposite side of the strap 15, such movement of the clamping member draws the two ends of the strap 15 toward each other and contracts the strap upon any object which it may embrace.

Because of the small area of contact between the edge of each of the lips 21 and the bottom of its associated groove 17, forcing of the clamping member axially produces unit compression stresses great enough to cause some deformation of the metal, which aids in retaining the clamping member in position when the clamp has once been tightened. It may be desirable in some instances to make the clamp member 20, or at least the edges of the lips 21, somewhat harder than the material of the strip 15 so that the lips will actually cut into the material of the strap at the bottom of the groove 17, as indicated in Fig. 13. Making the lips and groove-bottoms of different degrees of hardness also has the advantage that it tends to prevent galling which might interfere with tightening of the clamp.

As will be apparent from Fig. 13, I contemplate that the clamping member 20 will be free from contact with the strap 15 or the ribs 16 except at the bottom of the grooves 17. As a result, substantially no bending stresses are imposed on the strip 15 or the ribs 16 when the clamp is tightened, and substantially the only stress created in the strap 15, aside from the circumferential tension causing its contraction, is shear along the line A of Fig. 13.

It will be noted further that the line A in Fig. 13, along which is applied the effort drawing the two ends of the strap 15 together, is very close to tangency with the circumferentially projected inner surface of the strap, departing from tangency by a distance less than the thickness of the strap. This promotes uniformity of constrictive effort at substantially all points throughout the circumference of the strap.

In the drawing, I have illustrated several different applications of my clamp. In Fig. 3, for example, I have shown it employed on the slotted lower end of the steering column 25 of an automobile, to contract the steering column into gripping engagement with a boss 26 on the steering-gear housing 27. In Fig. 4, I have shown the clamp as applied to the outer of two telescoping screw-threaded members to contract the slotted end of the outer member and lock them in fixed position of relative adjustment. In Figs. 5 and 6, I have shown the clamp used as a hose clamp to seal the joint between a flexible hose 30 and a tube of rigid material 31 received within it.

While the degree of divergence of the two grooves 17 may be made so slight that the clamping member 20 will be held by mere friction in the position it occupies when the clamp is tightened, I prefer to supplement the action of friction in order to make possible a greater degree of divergence of the grooves 17 and thereby to increase the extent to which the strap 15 may be contracted. If the clamping member is so proportioned that its narrow end lies within the axial limits of the strap 15 and grooves 17, a very effective lock preventing the clamping member from working loose is formed by the shoulder created in the bottom of the groove 17 as the metal of the groove-bottom resiliently returns, at least partially, to its normal condition after passage of the lip 21 which has deformed it. I prefer, therefore, to make the axial length of the clamping member 20 somewhat less than the width of the strap 15, as is indicated in all the modifications illustrated in the drawing, so that the narrower end of the clamping member may lie within the axial limits of the strap 15 and grooves 17 without the opposite end of the clamping member projecting beyond the strap.

If a still more positive locking action is desired, especially if the clamp is used in situations where it probably will never have to be removed, one of the ribs 16 may be staked at a point adjacent the narrower end of the clamping member, as indicated at 35 in Figs. 8 and 11. Still another means for locking the clamping member in position is illustrated in Figs. 9 and 10, where I have shown a locking element in the form of a strip of metal 36 having at one end a head 37 bridging the wider end of the gap between the two ribs 16, extending rearwardly through the clamping member 20, and having its opposite end bent outwardly around the clamping member as indicated at 38 to hold the clamping member in position and prevent it from working loose.

To release the clamp, it is necessary only to drive or force the clamping member axially of the clamp in the direction in which the grooves 17 converge. Where it is not desired to preserve the clamp for reuse, release of the clamping member may be secured by subjecting it to sufficient radial pressure tending to flatten its arched shape and spread the lips 21 apart.

While I prefer to make the strap 15 of a strip having the shape of a symmetrical trapezoid so that the two ribs 16 in the finished clamp will be symmetrically disposed about an axial plane as shown in Figs. 6 and 9, this is not essential. In the clamp of Fig. 8, for example, only one of the ribs 16 is oblique, the other rib being perpendicular to the sides of the strap.

In all the modifications of my invention illustrated and described the clamp is used solely for constrictive purposes and is not used as a medium by which the element gripped by the clamp may be secured to an outside support. My invention, however, is not limited to this type of clamp.

I claim as my invention:

1. A clamp-collar, comprising a strap in circular form and having ends spaced apart, and a clamping member circumferentially overlapping the spaced-apart strap-ends, said clamping member having opposite side edges extending inwardly to form lips directed toward each other and diverging axially of the clamp-collar, the ends of said strap being provided with abutment surfaces respectively engaging the edges of said lips, each of said lips and its associated abutment surface having an area of contact which extends axially of the clamp-collar but which is relatively narrow, and the edges of said lips being of harder material than the abutment surfaces they engage.

2. A clamp-collar, comprising a strap in circular form and having non-parallel ends disposed in circumferentially spaced relation, a rib extending across each end of the strap and exteriorly thereof, said ribs being respectively provided in their remote faces with grooves the bottoms of which diverge axially, and a clamping member having a general arch-shape in cross-section and possessing side edges which extend inwardly to form lips receivable respectively in said grooves, said lips diverging complementarily to the bottoms of said grooves, the intermediate portion of said arch-shaped clamping member being spaced outwardly from said ribs, whereby the intermediate portion of said arch-shaped clamping member may be flattened by the application of an inwardly directed force to spread said lips apart and release the clamp.

3. The invention set forth in claim 2 with the addition that the depth of arching of said arch-shaped clamping member decreases progressively in the direction in which said lips diverge.

WILLIAM K. CRESON.